Figure 1:
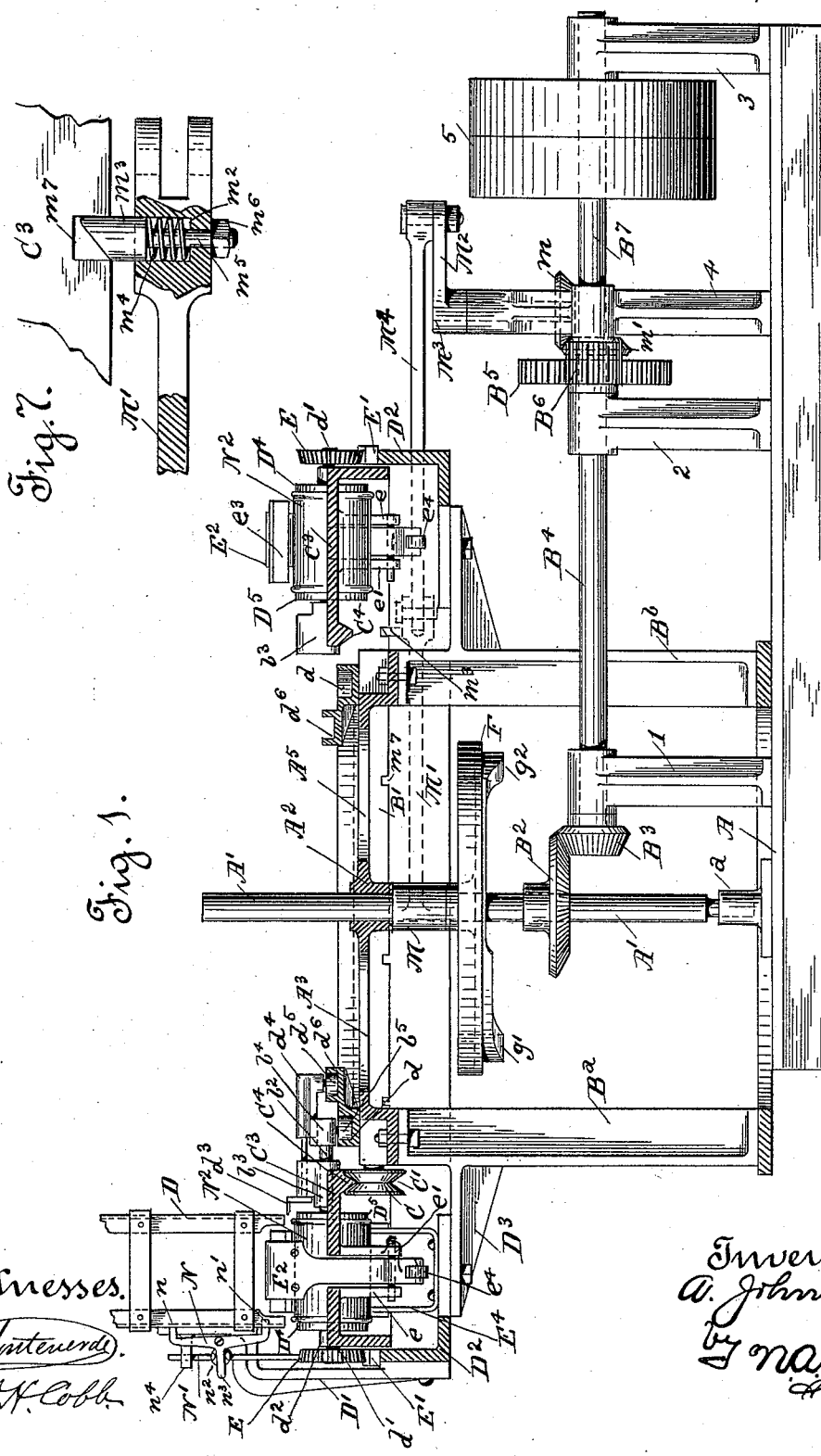

(No Model.)　　　　　　　A. JOHNSON.　　　　　4 Sheets—Sheet 2.
CAN SOLDERING MACHINE.

No. 575,807.　　　　　　　　　Patented Jan. 26, 1897.

(No Model.) 4 Sheets—Sheet 3.

A. JOHNSON.
CAN SOLDERING MACHINE.

No. 575,807. Patented Jan. 26, 1897.

Witnesses.
J. E. Monteverde
W. H. Cobb

Inventor.
A. Johnson
by N. A. Acker
Atty (No Model.) 4 Sheets—Sheet 4.

A. JOHNSON.
CAN SOLDERING MACHINE.

No. 575,807. Patented Jan. 26, 1897.

Witnesses.
H. Monteverde.
W. H. Cobb.

Inventor.
A. Johnson
by N. A. Acker
Atty

THE NORRIS PETERS CO., PHOTO-LITHO., WASHINGTON, D. C.

UNITED STATES PATENT OFFICE.

AXEL JOHNSON, OF OAKLAND, CALIFORNIA, ASSIGNOR OF TWO-THIRDS TO CHARLES JOSSELYN, OF WOODSIDE, CALIFORNIA.

CAN-SOLDERING MACHINE.

SPECIFICATION forming part of Letters Patent No. 575,807, dated January 26, 1897.

Application filed November 11, 1895. Serial No. 568,542. (No model.)

*To all whom it may concern:*

Be it known that I, AXEL JOHNSON, a citizen of the United States, residing at Oakland, in the county of Alameda and State of California, have invented certain new and useful Improvements in Can-Soldering Machines; and I do hereby declare that the following is a full, clear, and exact description thereof.

The present invention relates to a certain new and useful can-soldering machine, more especially designed for soldering the side seam of the can-body; and it consists in the arrangement of parts and details of construction as will be hereinafter set forth in the drawings and described and pointed out in the specification.

This invention is designed for soldering the side seam of a formed can having a lock-joint; and it consists of mechanism for receiving the can as conveyed from the can-making machine, of devices for rotating the can within its seat until the lock-joint or side seam is placed in position to come directly under the soldering-irons and holding the can in such position until the side seam has been soldered, of mechanism for imparting a reciprocating movement to the soldering-irons and flux-applying device and for raising and lowering the same, and of devices for imparting an intermittent movement to the can-carrying table, the invention being more especially adapted for the soldering of the side seam of that class or style of cans made under Letters Patent of the United States No. 526,925, granted to Johnson and Black October 2, 1894.

In order to fully comprehend my invention, reference must be had to the accompanying sheets of drawings, forming a part of this application, wherein—

Figure 2:
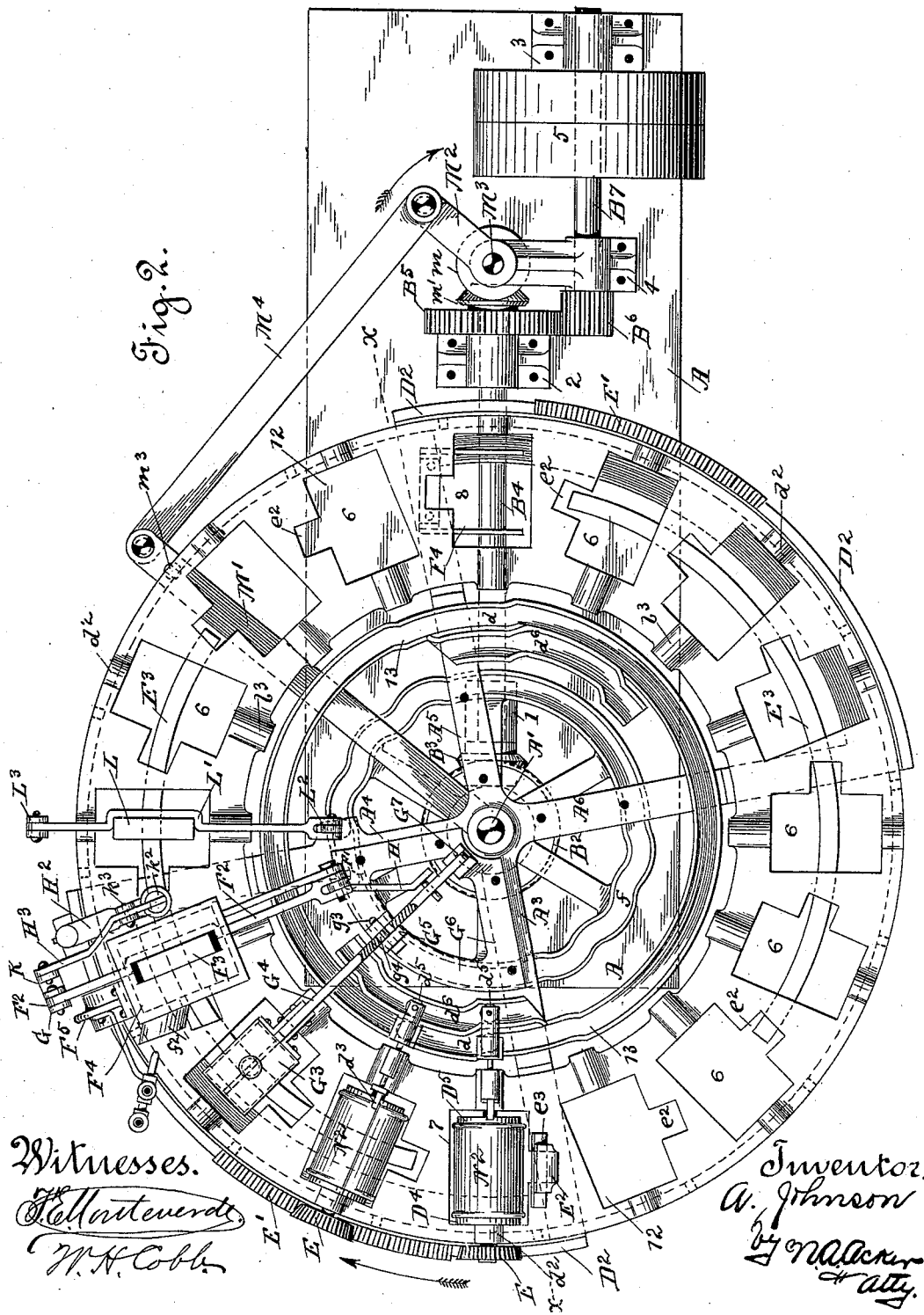
Figure 3:
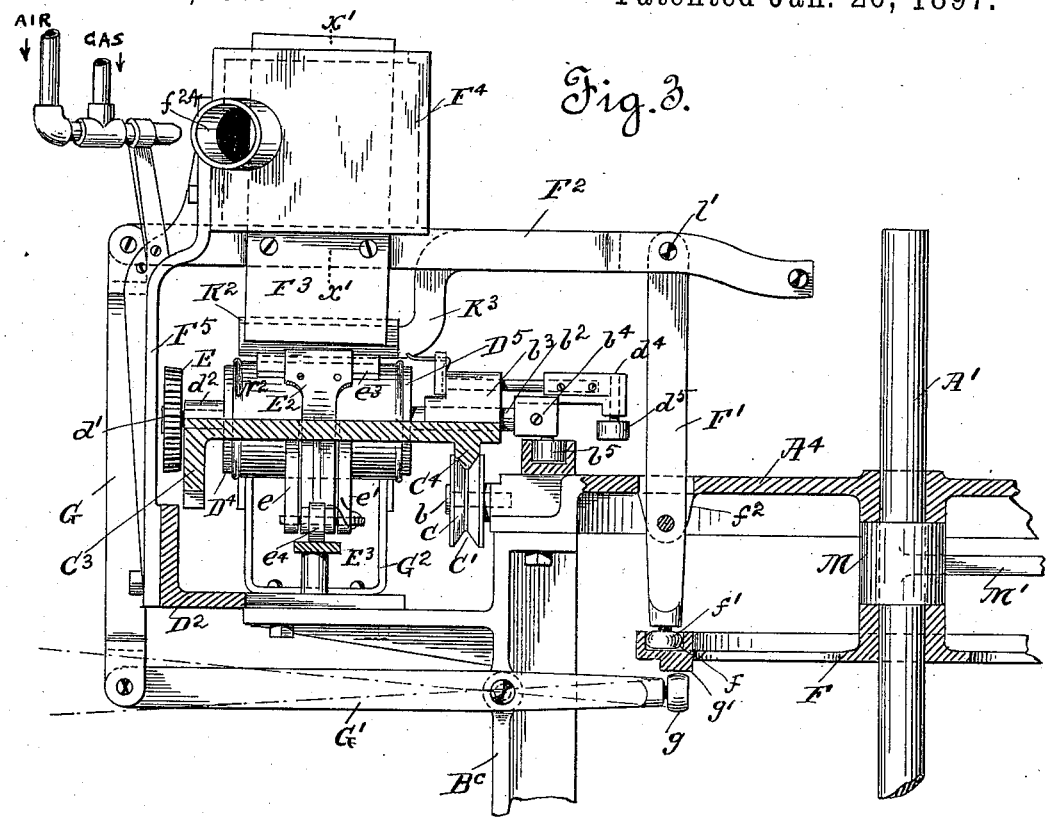
Figure 4:
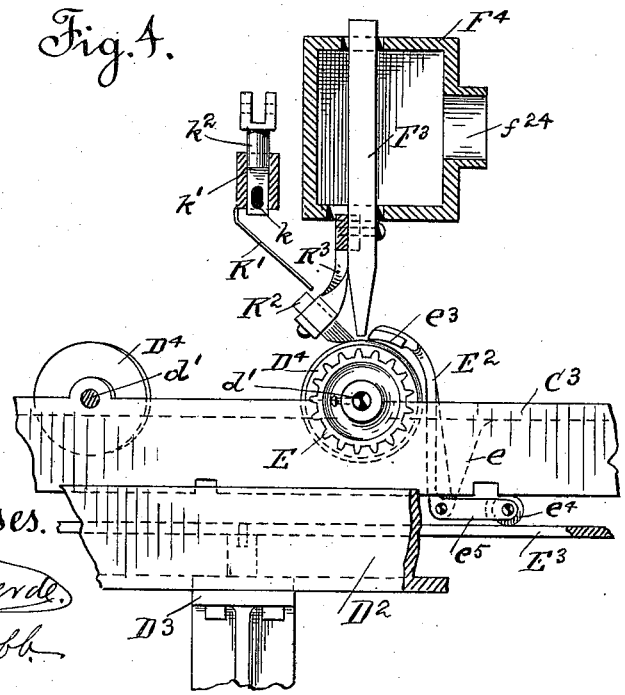
Figure 5:
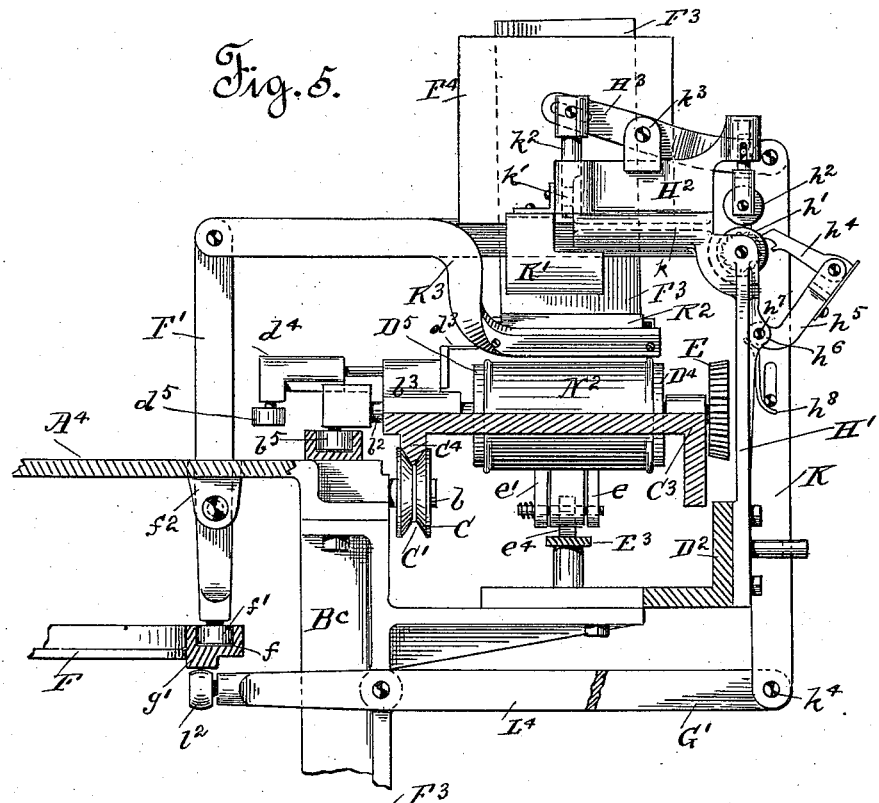
Figure 6:
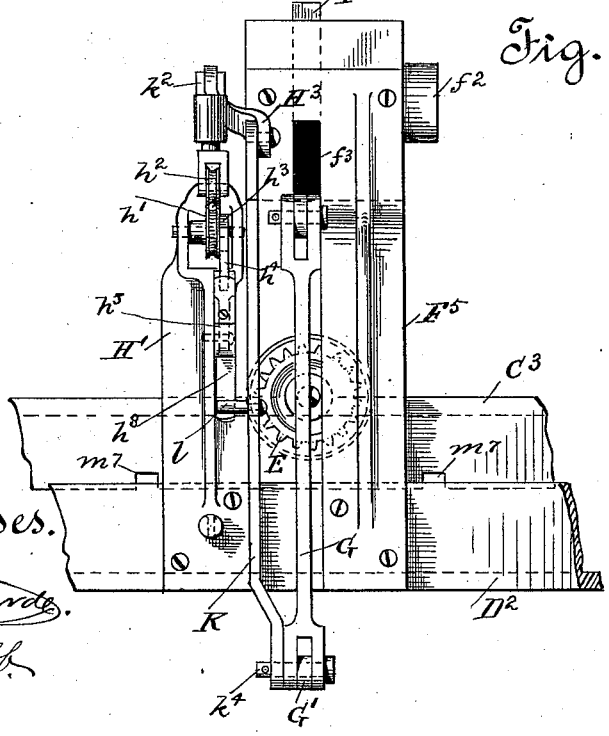

Figure 1 is a side view in elevation of the machine, the rotatable can-carrying table and the spider-frame being shown in section on line $xx$, Fig. 2. Fig. 2 is a top plan view of the machine, one of the flux-applying receptacles, the solder-feed devices, and one pair of soldering-irons being removed. Fig. 3 is an enlarged detail view, in side elevation, of one of the soldering-irons, showing the position of the can while held beneath the soldering-iron and mechanism for imparting a reciprocating movement to the soldering-iron and for raising and lowering the same. Fig. 4 is an end view of the mechanism illustrated by Fig. 3, the soldering-iron being shown in section on line $x'x'$, Fig. 3, and the gas and the air supply pipes and the levers for operating the soldering-irons being removed. Fig. 5 is a rear view in elevation of the mechanism illustrated by Fig. 3, fully showing the wire-solder-feed mechanism. Fig. 6 is an end view of the mechanism illustrated by Fig. 5, and Fig. 7 is a broken detail view of the arm for rotating the can-carrying table.

In the present machine I make employment of two sets of soldering-irons, two flux-applying devices, and two wire-solder-feed devices, so that two cans may be received into the machine at separate points and acted upon at the same time in order to increase the capacity of the machine, although in the present drawings I illustrate only one flux-applying device, one pair of soldering-irons, and one wire-solder-feed device, the description of these devices answering for the others.

The letter A is used to indicate any suitable base for the machine and A' the vertical central drive-shaft, which works in bearing $a$ of the base, Fig. 1, being held in position by the spider-frame $A^2$, through which it extends. The spider-frame is cast with the circular rim B', and said frame is supported by four vertical supports extending from the base A, to which supports the arms $A^3$, $A^4$, $A^5$, and $A^6$ are bolted.

Upon the vertical shaft A' is secured the bevel-wheel $B^2$, which meshes with the bevel-pinion $B^3$, secured to the inner end of the shaft $B^4$. This shaft works in bearings of the supports 1 2, and upon the outer end portion thereof is secured the gear $B^5$, which meshes with the pinion $B^6$, secured to the inner end of the short shaft $B^7$, which shaft works in bearings of the supports 3 4 and is driven through the medium of a belt (not shown) working over belt-wheel 5, secured upon the said shaft. As the shaft $B^7$ is rotated the motion thereof is imparted to the shaft $B^4$, which transmits the motion to the vertical shaft A' through the medium of the bevel-pinion $B^3$ and the bevel-wheel $B^2$.

From the outer face of the circular rim B' project a series of short pins or studs $b$, upon each of which I secure a roll C, which roll has cut in the periphery thereof the V-shaped groove C'. These rolls support the rotatable circular can-carrying table C³, which table is provided with an inner downwardly-projecting V-shaped flange C⁴, which rests or fits within the V-shaped groove C' cut in the periphery of the rolls C.

The rotatable circular can-carrying table has cut therein a series of can-openings 6, there being sixteen in the present machine. Into these can-openings fall the cans as delivered from the can-chute D, which conveys the cans from the can-making machine to the can-soldering machine. I make use of two can-feed chutes, which discharge the cans into the can-openings 6 at points 7 8, although in the drawings I show only one feed-chute. Each feed-chute is supported by a bracket D', (only one being shown in Fig. 1,) secured to and inwardly projecting from the plate D², bolted to the brackets D³, outwardly projecting from the supports Bᵃ Bᵇ, Fig. 1.

Within each can-opening 6 of the rotatable can-carrying table I locate the can-clamping disks D⁴ D⁵. The stem $b^2$ of the disk D⁵ extends through the shoulder $b^3$ of the can-carrying table and has the head-block $b^4$ secured to its inner end. This head-block is provided with a roll $b^5$, which works within the eccentric groove $d$ of the circular rim B' of the spider-frame, Figs. 1, 2, and 3. As the roll $b^5$ moves within the eccentric groove with the rotary travel of the can-carrying table the stem $b^2$ is moved outward and inward, so as to cause the clamping-disk D⁵ to move toward or from the end of the can in order to clasp and to release the same. The stem $d'$ of the clamping-disk D⁴ extends through the shoulder $d^2$ and has secured to its outer end the rack-pinion E. This pinion engages with the teeth of the rack-plate E', which is secured to the upper edge of the plate D². The rack-plate E' extends for only a short distance. As the rack-pinion moves over the rack-plate after the can has been engaged between the disks D⁴ D⁵ the can is revolved until the lock-joint or side seam is engaged by the finger $d^3$, which holds the can in such position until it is carried beneath the soldering-iron. The stem of this finger extends through an opening cut in the shoulder $b^3$ above the opening through which the stem of the disk D⁵ works, and the inner end thereof is fastened within the thimble $d^4$, which carries the roll $d^5$. The roll $d^5$ works within the short eccentric groove $d^6$ cut in the circular plate of the spider-frame, Figs. 1 and 2. As the roll $d^5$ is carried within the eccentric groove with the rotary travel of the can-carrying table the finger $d^3$ is moved toward and from the can held between the clamping-disks D⁴ D⁵.

Each can-opening of the can-carrying table has located therein the jaw E², which is fulcrumed between the brackets $e$ $e'$, depending from the under face of the rotatable can-carrying table, Fig. 3. The clamping-jaw E² moves within the sockets $e^2$, cut in the can-carrying table in advance of each can-opening, when thrown out of engagement with the can held between the clamping-disks. The upper end of the clamping-jaw is curved, so as to fit over the can-body and is provided with the tile-facing $e^3$, which may be removed when worn and another inserted in the place thereof. The object of this jaw is to press down the lock-joint of the can while the same is being soldered and to hold the can until the solder cools, so as to prevent the side seam from springing. To the right-angle tail or end $e^5$ of the said jaw is secured the roll $e^4$, which rides upon the track E³ as the can-carrying table is rotated. When the roll $e^4$ rides upon this track, the jaw E² is thrown over against the clamped can and it is held in this position until the roll $e^4$ leaves the track E³, when the weight of the tail or end $e^5$ will cause the jaw to swing away from the can.

The track E³ is fastened below the can-carrying table, Figs. 3 and 5. In the present instance I have shown two tracks, for the reason that the machine is designed to solder two cans at the same time. These tracks extend only part way around the machine, each track commencing a short distance beyond the feed-chute for the cans and terminating a slight distance in advance of the discharge-point. Consequently the clamping-jaw is not thrown against the can until after the same has been grasped by the disks D⁴ D⁵, nor is the jaw released until the can approaches within a short distance of the point of discharge.

Directly below the feed-chute D is secured to one of the brackets D³ the upwardly-extending U-shaped rest E⁴, Fig. 1. This rest holds the can in its proper position within the can-opening of the rotatable can-carrying table until the ends thereof are grasped by the disks D⁴ D⁵. If this rest or an equivalent device be not provided, the can as delivered from the feed-chute will pass through the can-opening of the rotatable can-carrying table.

To the vertical shaft A', above the bevel-wheel B², is secured the circular plate F, in the upper face of which is cut the eccentric groove $f$. This plate is rotated with the movement of the vertical shaft, and within the eccentric groove $f$ works the roll $f'$, secured to the lower end of the lever F', which lever is fulcrumed between the ears $f^2$, depending from the arm A⁴ of the spider-frame A², Fig. 3. To the upper end of the lever is fulcrumed the soldering-iron arm F². The outer end of said soldering-iron arm extends through an opening cut in the supporting-plate F⁵ and is connected to the upper end of the rod G. The lower end of this rod is secured to the outer end of the fulcrumed lever G', which is fulcrumed to the support Bᶜ, Fig. 3. This lever has the roll $g$ secured to its inner end, which rides upon the inclined shoulders $g'$ $g^2$, formed upon the under face of the plate F. As the roll rides upon the inclined shoulders $g'$ the inner end of the fulcrumed lever $G'$ is lowered, which raises the outer end and lifts the fulcrumed soldering-iron arm $F^2$, through the medium of the rod G, in order to lift the soldering-iron from off the can. The soldering-iron arm is lowered as the roll $g$ moves off the inclined shoulders $g'$. The soldering-iron, when lowered, is reciprocated back and forth over the seam of the can as the roll $f'$ moves within the eccentric groove $f$, which throws the fulcrumed lever $F'$ in and out. This lever, carrying the soldering-iron arm $F^2$ therewith, moves the soldering-iron back and forth over the seam of the can. The fire-box $F^4$, within which the soldering-iron extends, is attached to the supporting-plate $F^5$. Into this box the flame enters through the opening $f^{24}$.

In order to provide against the can slipping from between the can-holding disks $D^4$ $D^5$ while the weight of the soldering-iron bears thereon, I secure to a bracket projecting from the support $B^c$ the U-shaped can-rest $G^2$, which is similar to the can-rest $E^4$. This rest is located directly below the soldering-iron, and it upholds the can should it tend to slip when the weight of the soldering-iron is brought to bear thereon.

A short distance in advance of the soldering-iron $F^3$ is located the flux-reservoir $G^3$, Fig. 2. This reservoir is attached to the arm $G^4$, fulcrumed to the standard $G^5$, upwardly projecting from the plate $G^6$, fastened to the arms of the spider-frame $A^3$. The pin $g^3$, which secures the arm $G^4$ to the standard $G^5$, passes through an elongated slot $g^4$ cut in the said arm, in order that the arm may be moved in and out so as to cause the flux-reservoir to move back and forth over the side seam of the can carried by the rotatable can-carrying table. The inner end of the arm $G^4$ rests within a groove cut within the upper end of the standard $G^7$, and said arm is connected to the soldering-iron arm $F^2$ by the strap H. Consequently the arm $G^4$ is carried forward and backward with the movement of the soldering-iron arm $F^2$ and is likewise raised and lowered with the vertical movement of the said soldering-iron arm.

To the plate $D^2$, immediately beyond the supporting-plate $F^5$ for the fire-box, is bolted the standard or support $H'$, the upper end of which terminates in an inwardly-projecting extension $H^2$, Figs. 5 and 6. The upper portion of the standard or support $H'$ is cut away, and within the cut-away portion I locate the wire-solder-feed rolls $h'$ $h^2$. Upon the shaft of the roll $h'$ is secured the ratchet-wheel $h^3$, which is rotated by the pawl $h^4$. This pawl is connected at its outer end to the lever $h^5$, which is fulcrumed between the ears $h^6$ by the pin $h^7$. To the lower end of this lever is secured the downwardly-extending curved piece $h^8$. Through the extension $H^2$ is drilled the opening $k$, through which the wire-solder passes as fed from between the rolls $h'$ $h^2$. In the inner end portion of said extension is formed the vertical opening $k'$, within which works the cutting-knife $k^2$ for the wire-solder. The knife is connected to the inner end of the lever $H^3$, fulcrumed between the ears $k^3$, upwardly projecting from the extension $H^2$, Fig. 5. The outer end of this fulcrumed lever is connected to the vertical rod K, which rod is fastened at its lower end to the pin $k^4$, which connects the rod G to the fulcrumed lever $G'$. As thus connected it is obvious that the rod K is raised and lowered with the rod G. The upward movement of the rod K throws the inner end of the fulcrumed lever $H^3$ downward, which carries the knife $k^2$ therewith and causes the same to cut the strip of solder projecting beyond the extension $H^2$. From the rod K laterally projects the pin or stud $l$, which engages with the free end of the curved piece $h^8$ as the rod K is moved downward. As the pin or stud bears upon the free end of the curved piece $h^8$, during the downward movement of the rod K, the said piece is thrown inward, which throws the fulcrumed lever $h^5$, to which it is connected, outward, the outward movement of which lever causes the pawl $h^4$ to move out of engagement with the ratchet-wheel $h^3$. With the upward movement of the rod K the pin or stud engages the lever $h^5$ and causes the upper end thereof to move inward, the inward movement of which lever causes the pawl $h^4$ to engage with the ratchet-wheel $h^3$ and to rotate the same one tooth. As the ratchet-wheel is rotated the roll $h'$ is moved therewith, so as to force the wire-solder between the rolls $h'$ $h^2$.

The piece of wire-solder, as cut by the knife $k^2$, drops upon the shield-plate $K'$, secured to the extension $H^2$ of the standard $H'$, by which it is conveyed to the guide-plate $K^2$, secured to the curved arm $K^3$, secured to the pin $l'$, which connects the soldering-iron arm $F^2$ to the lever $F'$, Figs. 2 and 3. The guide-plate is placed at an incline, and being arranged directly behind the soldering-iron $F^3$, Fig. 4, places the piece of solder upon the side seam of the can beneath the soldering-iron.

A short distance beyond the first soldering-iron $F^3$ is located a second soldering-iron L, which is located within a fire-box (not shown) similar to the fire-box $F^4$. This soldering-iron is fastened to the soldering-iron arm $L'$, which is connected at its inner end to the fulcrumed lever $L^2$, which lever is a duplicate of the lever $F'$ and works in the same manner. The outer end of the soldering-iron arm is connected to the upper end of the vertical rod $L^3$, the lower end of which is connected to the outer end of the fulcrumed lever $L^4$. This lever has the roll $l^2$ secured to its inner end, which roll rides upon the inclined shoulders $g'$ $g^2$ of the plate F in order to impart vertical movement to the lever $L^4$. It will be observed that the soldering-iron L is operated in the same manner as the soldering-iron $F^3$.

Upon the vertical shaft $A'$ is loosely fitted above the plate F the hub M, from which outwardly extends beyond the rotatable can-carrying table C³ the arm M'. This arm is connected to the crank-arm M², secured to the vertical shaft M³, by the rod M⁴. To the lower end of the vertical shaft M³ is secured the bevel-pinion $m$, which meshes with the bevel-pinion $m'$, secured to the outer end of the shaft B⁴, Figs. 1 and 2. The vertical shaft M³ derives its motion from the shaft B⁴ through the medium of the bevel-pinions $m\ m'$. As the vertical shaft M³ is rotated the crank-arm M² is carried around, which throws the arm M' back and forth through the medium of the connecting-rod M⁴.

Within the outer end portion of the arm M' is cut a socket $m^2$, Fig. 7, within which is fitted the pin $m^3$. This pin is forced upward by the spring $m^4$, located within the socket $m^2$. The stem $m^5$ of the pin projects through the arm M' and has secured to the end thereof the nut $m^6$, which prevents the pin from being moved upward beyond a given distance. In the lower face of the rotatable can-carrying table C³, Figs. 2 and 7, is cut a series of notches $m^7$ a given distance apart, into which the pin $m^3$ moves. When the pin engages with either of the notches cut in the can-carrying table, the said table will be carried around or be given a step rotation with the forward throw of the arm M'. As the arm M' is thrown backward the pin $m^3$ is moved from within the notch and is carried with the arm until the next notch is reached, when it will be forced therein by the pressure of the spring $m^4$. The upper end of the pin $m^3$ is inclined, in order that it may be gradually moved downward from within the notch of the can-carrying table as the arm M' is thrown backward. It will be observed that the can-carrying table is intermittently rotated, being advanced a given distance with each forward throw of the arm M'.

To the upper portion of the bracket D' is fulcrumed the dog N, the teeth $n\ n'$ of which project within the can-feed chute D, so as to hold the cans therein and prevent more than one can being dropped therefrom at a time. The dog N is thrown inward and outward, in order to permit the discharge of the cans from the feed-chute, by means of the vertical rod N', which rod is raised and lowered during the rotary travel of the can-carrying table. The rod N' works through a guide-opening formed in the bracket $n^4$, projecting from the side of the feed-chute, and upon the said rod N' is secured the collar $n^2$, through an opening formed in which extends the lug $n^3$, projecting from the fulcrumed dog. As the vertical rod N' is raised the lower end of the fulcrumed dog is moved outward, so as to withdraw the tooth $n'$ from within the feed-chute and permit the lower can to drop from within the feed-chute into one of the can-openings 6 of the can-carrying table. The tooth $n$ of the fulcrumed dog is thrown within the feed-chute as the tooth $n'$ is withdrawn therefrom, in order to prevent the second can from falling from within the feed-chute. The rod N' as moved downward throws the fulcrumed dog so as to force the tooth $n'$ within the feed-chute and withdraw the tooth $n$ therefrom.

The operation of my device is as follows: The can N², as delivered from the can-feed chute, falls into one of the can-openings 6 cut in the rotatable can-carrying table, being supported therein by the can-rest E⁴, Fig. 1. As the rotatable can-carrying table is carried around by the forward throw of the arm M' the disk D⁵ is forced outward by the roll $b^5$ traveling within the eccentric groove $d$ until the can is held between the disks D⁴ D⁵. With the outward movement of the disk D⁵ the finger $d^3$ is moved outward over the end of the can N² engaged by the disk D⁵ by the roll $d^5$ working within the eccentric groove $d^6$. The rotatable can-carrying table continuing its rotary movement causes the pinion E to ride upon the rack-plate E', which imparts a rotary movement to the disk D⁴ and rotates the can N² until the side seam thereof engages with the projecting finger $d^3$. When the finger $d^3$ engages with the side seam of the can, the said can will be held against further rotation. In this position the can is carried first beneath the flux-reservoir G³, which is reciprocated over the side seam thereof, as before described, and thence to the soldering-iron F³, resting upon the can-rest G². As the soldering-iron F³ is lowered to bear upon the side seam of the can the knife $k^2$ cuts a piece of solder, which drops upon the plate K' and rolls onto the plate K², by which it is placed upon the side seam of the can beneath the soldering-iron F³. The soldering-iron F³ is then moved back and forth over the side seam of the can by the reciprocating movement of the soldering-iron arm F², which is operated by the fulcrumed lever F'. Prior to the can being placed below the soldering-iron F³ the finger $d^3$ is withdrawn from the end of the can as the roll $d^5$ moves from within the groove $d^6$, in order that the movement of the soldering-iron may not be interfered with. With the upward movement of the soldering-iron F³ the rotatable can-carrying table is advanced a step, so as to place the can beneath the second soldering-iron L, which sweats the solder into the side seam or joint. This soldering-iron is operated in the same manner as the first soldering-iron. After leaving the soldering-iron L the can is held between the disks D⁴ D⁵ until the discharge-point 12 is reached. The disk D⁵ at this point is drawn away from the can by the roll $b^5$ entering within the irregular portion 13 of the groove $d$, which releases the can N² and permits the same to fall from within the opening 6 into the discharge-chute or runway (not shown) located at this point.

Having thus described my invention, what I claim as new, and desire to secure protection in by Letters Patent, is—

1. In a machine for soldering the side seam of cans, the combination with a rotatable can-carrying table having a series of can-openings cut therein, of the clamping-disks secured and working within the can-openings of the rotatable can-carrying table for holding the can therein, of devices for moving the clamping-disks toward and from each other so as to clamp and release the can, of mechanism for imparting a step rotation to the can-carrying table, and the flux-applying and soldering mechanism.

2. In a machine for soldering the side seam of cans, the combination with the rotatable can-carrying table having a series of can-openings cut therein, of the clamping-disks located within the can-openings of the rotatable can-carrying table for holding of cans therein, devices for moving one of said clamping-disks toward and from the end of the can and devices for rotating the opposite disk in order that the can may be rotated so as to bring the side seam in line with the soldering-irons, of a movable finger with which the side seam of the can engages when in proper position, and of the flux-applying and soldering mechanism.

3. In a machine for soldering the side seam of cans, the combination with the rotatable can-carrying table, of a series of can-openings cut therein, of movable devices for holding the cans within the can-openings while being soldered and releasing the same after being soldered, of mechanism for imparting a step rotation to the can-carrying table, and of the flux-applying and soldering mechanism.

4. In a machine for soldering the side seam of cans, the combination with the rotatable can-carrying table having a series of can-openings cut therein, of the clamping-disks secured within the can-openings, of devices for moving the clamping-disks so as to grasp and release the cans, of the clamping-jaw working within the can-opening of the can-carrying table, devices for throwing the clamping-jaw toward and from the can, mechanism for imparting a step rotation to the can-carrying table, and of the flux-applying and soldering mechanism.

5. In a can-soldering machine, the combination with the soldering mechanism, of the wire-solder-feed mechanism, the knife for cutting the solder, the shield upon which the cut piece of solder falls, and the guard-plate which receives the cut piece of solder and places the same upon the seam of the can.

6. In a machine for soldering the side seam of cans, the combination with the feed-chute for the cans, of the rotatable can-carrying table, mechanism for imparting a step rotation to the can-carrying table, a series of can-openings cut in the can-carrying table, devices located within said can-openings which hold the cans therein and revolve the same so as to place the side seam in position to be acted upon by the soldering-iron, of a device for engaging the side seam of the can so as to hold the can in proper position, and of the flux-applying and soldering mechanism.

7. In a machine for soldering the side seam of cans, the combination with the can-feed chute, of the rotatable can-carrying table, of a series of can-openings cut in the can-carrying table, the can-rest secured below the can-carrying table in line with the feed-chute for supporting the can as received from the can-feed chute into the can-opening of the can-carrying table, of devices for engaging the can and securing the same within the can-opening of the can-carrying table, and of mechanism for imparting a step rotation to the can-carrying table.

In testimony whereof I affix my signature, in presence of two witnesses, this 23d day of October, 1895.

AXEL JOHNSON.

Witnesses:
N. A. ACKER,
LEE D. CRAIG.